Figure 1:
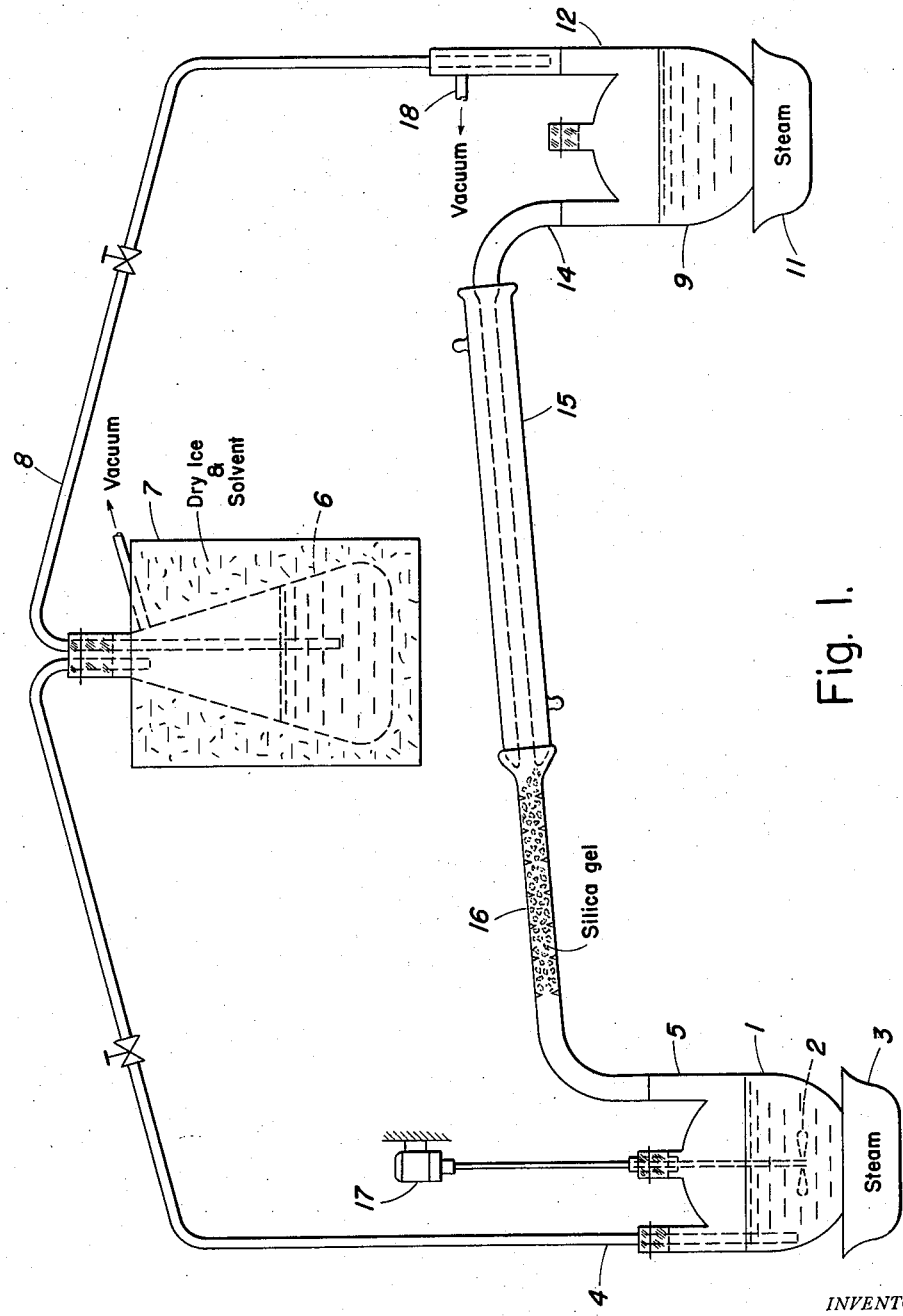

Aug. 12, 1958     W. A. HOSMER     2,847,407
MOLECULAR WEIGHT FRACTIONATION OF POLYVINYLPYRROLIDONE
Filed April 27, 1956     2 Sheets-Sheet 1

INVENTOR.
William A. Hosmer

BY

ATTORNEYS

Aug. 12, 1958  W. A. HOSMER  2,847,407
MOLECULAR WEIGHT FRACTIONATION OF POLYVINYLPYRROLIDONE
Filed April 27, 1956  2 Sheets-Sheet 2

INVENTOR.
William A. Hosmer

BY Henry W Coughlin
Harris D Hineline
ATTORNEYS

United States Patent Office 2,847,407
Patented Aug. 12, 1958

2,847,407

MOLECULAR WEIGHT FRACTIONATION OF POLYVINYLPYRROLIDONE

William A. Hosmer, Lee, Mass., assignor to General Aniline & Film Corporation, New York, N. Y., a corporation of Delaware Application April 27, 1956, Serial No. 581,225

8 Claims. (Cl. 260—88.3)

The invention here presented is a process and apparatus for separating polyvinylpyrrolidone into a plurality of cuts, each cut having a relatively narrow range of molecular weight, the molecular weights of the successive cuts being both narrow and the average significantly different.

In the preparation of polyvinylpyrrolidone it is very desirable that a given preparation have a relatively narrow range of molecular weight; and this is especially noteworthy in the preparation of blood plasma substitutes. In the use of these polymers as blood plasma substitutes the low molecular weight polymer is eliminated from the user's body in an unduly short period of time; the high molecular weight portions are eliminated unduly slowly and may not be eliminated at all; whereas the middle molecular weight fraction is strongly preferred because of the effectiveness thereof for a convenient period of time. Similarly, for some other uses, the low molecular weight material is preferable and for still other uses, the very high molecular weight is preferable. By very careful control of the polymerization reaction, a certain amount of narrowing of the molecular weight range is obtainable but to the present this narrowing has not been found to be sufficient for all of the various uses desired.

According to the present invention it is now found that by the use of acetone as a solvent, it is possible to fractionate the polymer to give the desired range of molecular weight values. In this connection use is made of the fact that the hydrated polyvinylpyrrolidone is substantially completely insoluble in acetone, and the intermediate molecular weight soluble polymers become insoluble in acetone at a relatively low temperature. Accordingly, the present process treats the crude polymer with hot acetone in which the middle and lower range of unhydrated polymer are soluble, whereas the top molecular weight range and the hydrated polymer are insoluble. In the hot acetone, these properties give a "layering" in which the hydrated polymer and high molecular weight polymer absorb enough acetone to liquify, while the middle and lower weight unhydrated polymers are soluble. The layer containing the dissolved middle and low ranges is then removed and the remaining layer extracted with further quantities of hot acetone which in turn is removed and combined with the first lot. The removed solutions then are cooled, preferably to minus 40° C. or below, preferably to temperature close to that of solid $CO_2$ at minus 77° C. This temperature causes the middle range of polymer to precipitate, again giving two layers in the container. The layer containing the lowest molecular weight material is then removed and the acetone evaporated for a return to the warm flask for further extraction of the crude polymer. This process thus becomes in effect a continuous one, since the various cuts may be removed from time to time as the acetone is evaporated.

By this procedure it thus becomes possible to prepare a series of cuts of varying average molecular weight of polyvinylpyrrolidone to give the desired narrow range polymer. Other objectives and details of the invention will be apparent from the following description when read in connection with the accompanying drawing in which Figure 1 is a diagrammatic representation of a laboratory style of processing equipment, and Figure 2 is a drawing in front elevation of plant equipment for the practice of the present invention.

Figure 2:
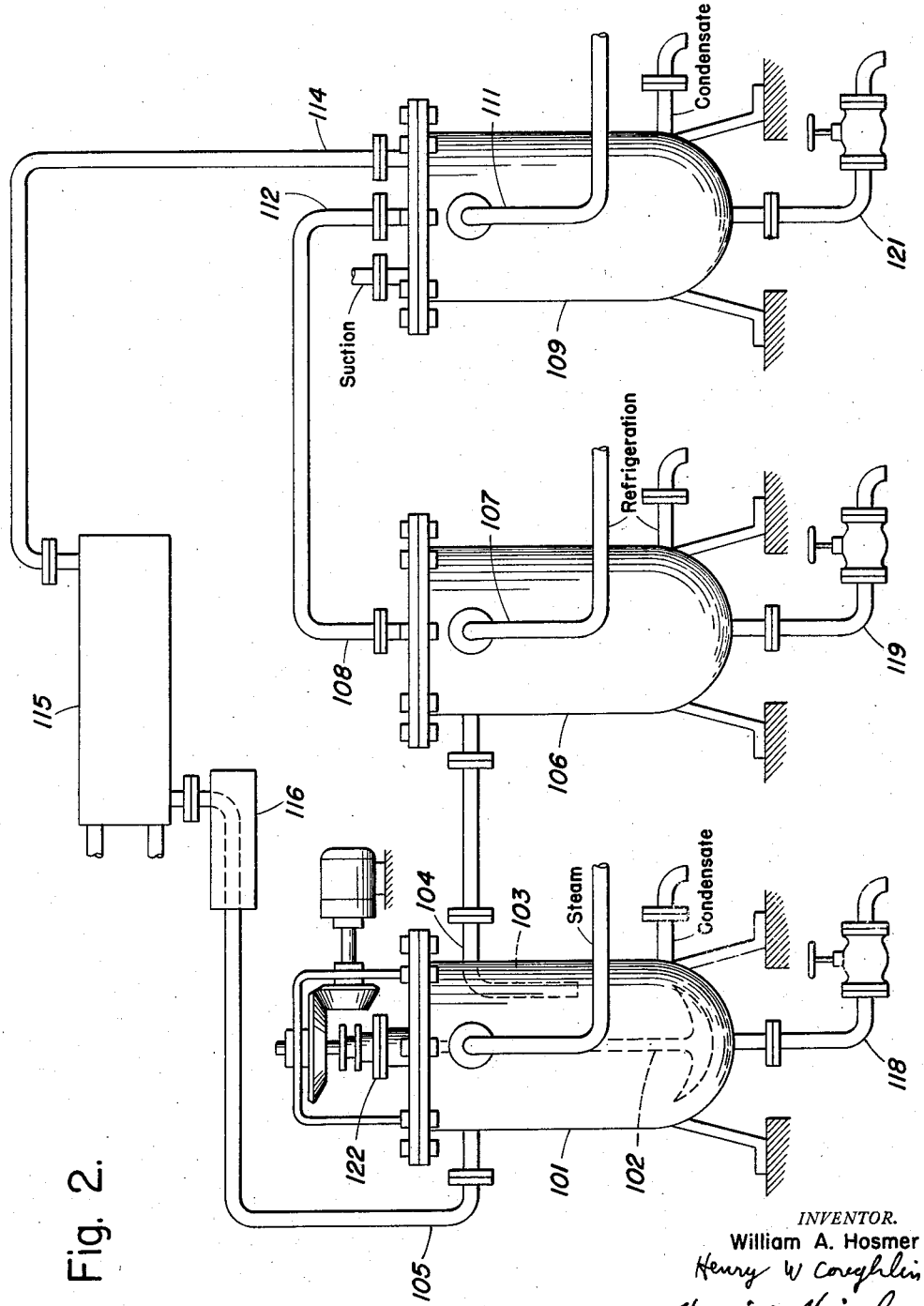

Referring to Figure 1 there is provided a closed container 1, equipped with a stirrer 2 and heating means 3. An adjustable discharge outlet 4 is also provided, and a return duct 5 is likewise provided. A cooling chamber 6 having a cooling jacket 7 is likewise provided. The cooling jacket may be cooled by any convenient artificial refrigeration system. Solid carbon dioxide in acetone serves excellently. Alternatively liquid carbon dioxide with an appropriate compressor and condenser serves equally well; or if desired, ammonia refrigeration or sulphur dioxide refrigeration also serve equally well. It is required only that the temperature be brought to a sufficiently low value. An outlet duct 8 from the cooling chamber 7 is likewise provided leading to a second heated chamber 9 equipped with heating means 11, also provided. The chamber 9 has an inlet port 12 and a vapor outlet port 14. A condenser 15 is connected to the vapor outlet 14 and a drying chamber 16 is provided at the end of the condenser to insure the delivery of dry acetone to the flask 1.

In the operation of this process, a suitable batch of the crude polymer is placed in the container, together with a liberal quantity of acetone sufficient to bring the acetone level well up toward the top of the container. The stirrer 3 under the drive of a motor 17 is then put into operation and heat is applied by the heater 3. When the acetone temperature has been brought well up towards the boiling point, and a maximum amount of solution has been obtained in the acetone, the stirrer 2 is stopped and the mixture in the container is allowed to stratify. The insoluble polyvinylpyrrolidone hydrate together with the high molecular weight polymer remains in the bottom layer and the middle weight and lower weight polymer is dissolved in the upper layer.

The application of suction to an outlet port 18 will draw the upper layer from the flask 1 into the cooling flask 6, where the acetone is cooled to a desired low temperature. If it is desired that the middle range of polymer be separated into several cuts, several cooling chambers 6 may be used at progressively lower temperatures. In these cooling chambers the higher molecular weight polymers are precipitated by the chilling and again stratification occurs, the lower molecular weight polymers being in the upper layer. This layer is then drawn over by suction into the flask 9 and the heating means 11 vaporizes the acetone from the container 9, delivering the vapors to the condenser 15 where they are liquified, dried in the dryer 16 and returned to the chamber 1 via the inlet 5. The stirrer is then put into operation a second time and the acetone allowed to collect in the container 3, until it is well filled again, whereupon the procedure above outlined may be repeated. After a suitable number of extractions, the polymer in the container 1 consists only of hydrated polymer and the very high molecular weight polymer; the polymer in the cooling chamber 6 consists only of the intermediate molecular weight polymer and the polymer in the container 9 consists only of the low molecular weight polymer. The respective polymers may be removed in any convenient way.

In batch operation the three containers are merely picked up and dumped. On a factory scale procedure, appropriate drainage means are provided for the removal of the various components and appropriate dissolving chambers and ducts are provided as will be obvious to those skilled in the art.

The above outline of the process and apparatus of the invention shows the apparatus in the form of equipment suitable for use on the bench for the making of small quantities of the several cuts. Figure 2 shows the same invention translated into plant scale equipment, in which there is provided a kettle member 101 corresponding to the flask 1 of the first, above mentioned, embodiment. This kettle is provided with a stirrer 102 as shown in dotted line within the kettle 101. There is also provided a steam jacket 103 and a discharge duct 104 having a riser portion inside of the kettle as shown in dotted lines. There is also provided an acetone return duct 105.

There is also provided a second kettle 106 having a refrigerating jacket 107 thereon and a discharge duct 108 leading to a third kettle 109 having a steam jacket 111 and a supply duct 112. There is also provided a vapor outlet duct 114 leading to a condenser 115 to which there is connected a dryer member 116. Kettle 101 is provided with a valve and drain system 118; the kettle 106 is similarly provided with a valve and drain system 119 and the kettle 109 is similarly provided with a valve and drain system 121.

In the operation of this plant production design, the same series of steps are conducted as in the first embodiment, with the exception that the hydrated polyvinylpyrrolidone and high molecular weight polymer are recovered by draining them through a valve and drain system 118; the middle weight polymer is similarly recovered by discharge through the valve and drain system 119 and the light cut is recovered by discharge through a valve and drain system 121. In addition, the crude polymer and necessary acetone to maintain the circulating supply are delivered into the kettle 101 through the supply port 122.

It will be observed that the above described embodiments of the device for practising the invention utilizes suction to transfer the acetone solution from one container to the next. While the boiling point of acetone at atmospheric pressure is 20° C. and suction lowers the boiling point slightly, no difficulty is encountered from undesired boiling in the containers under the influence of the suction, since all of the solutions are at temperatures well below the boiling point of acetone even under slightly reduced pressure.

However, if desired, the transfer may be effected by appropriate air pressure. If pressure is used, minor changes in the valve arrangements will be required but these will be obvious to those skilled in the art and need not be shown in the drawings; if pressure is to be used, it then becomes desirable to supply a valve on the outlet of the container 1 and a valve on the inlet of container 6. Air may then be supplied under pressure as desired by separate leads to the container 1 and to the container 6. Return of acetone from container 9 to container 1 is then obtained by valvulization as before. If air under pressure is used it is however desirable to provide a very efficient drier and an oil trap to remove moisture, oil and dirt. Air under pressure is satisfactory. However pressured air will yield a mixture of air and acetone vapor, which may be explosive. Accordingly if this is regarded as a hazard, it may be avoided by the use of nitrogen under pressure or carbon dioxide or other inert gas as desired.

By the apparatus and procedure of the present invention it thus becomes possible to separate crude polyvinylpyrrolidones into a plurality of fractions of relatively narrow molecular weight and varying molecular weight.

The process of the invention thus provides an apparatus and a process for the separation of fractions having varying molecular weights of polyvinylpyrrolidones of sequentially differing average molecular weights; which apparatus and process is suitable for batch operation, or for continuous operation.

While there are above disclosed but a limited number of embodiments of the apparatus and process of the invention it is possible to provide still other embodiments without departing from the inventive concept herein disclosed; and it is therefore desired that only such limitations be imposed upon the appended claims as are stated therein or required by the prior art.

The invention claimed is:

1. Apparatus for separating polyvinylpyrrolidone into fractions of relatively narrow molecular weight range comprising a container having a stirrer therein, a heating jacket there around, inlet and outlet ports, means for the delivery of polyvinylpyrrolidone and solvent thereto together with means for separating stratified fluid layers therein; a second container having a refrigerating jacket there around together with inlet, outlet and drain ports; the said inlet ports being connected to the said first container together with a second stratification separating means in said second container; a third container having a heating jacket there around for volatilizing solvent therein; the third container being connected to the stratification separating means in the second container.

2. Apparatus for separating polyvinylpyrrolidone into fractions of relatively narrow molecular weight range comprising a container having a stirrer therein, a heating jacket there around, inlet and outlet ports, means for the delivery of polyvinylpyrrolidone and solvent thereto together with means for separating stratified fluid layers therein; a second container having a refrigerating jacket there around together with inlet, outlet and drain ports; the said inlet ports being connected to the said first container together with a second stratification separating means in said second container; a third container having a heating jacket there around for volatilizing solvent therein; the third container being connecetd to the stratification separating means in the second container and a condenser and drying means connected between an outlet in said third container and an inlet to said first container.

3. Apparatus for separating polyvinylpyrrolidone into fractions of relatively narrow molecular weight range comprising a container having a stirrer therein, a heating jacket there around, inlet and outlet ports, means for the delivery of polyvinylpyrrolidone and solvent thereto together with means for separating stratified fluid layers therein; said heating and stirring means serving to dissolve the middle and low molecular weight polyvinylpyrrolidone into a solution in acetone and to leave the higher molecular weight and hydrated polyvinylpyrrolidone in a second stratified layer; a second container having a refrigerating jacket there around together with inlet, outlet and drain ports; the said inlet ports being connected to the said first container together with a second stratification separating means in said second container; a third container having a heating jacket there around for volatilizing solvent therein; the third container being connected to the stratification separating means in the second container.

4. Apparatus for separating polyvinylpyrrolidone into fractions of relatively narrow molecular weight range comprising a container having a stirrer therein, a heating jacket there around, inlet and outlet ports, means for the delivery of polyvinylpyrrolidone and solvent thereto together with means for separating stratified fluid layers therein; said heating and stirring means serving to dissolve the middle and low molecular weight polyvinylpyrrolidone into a solution in acetone and to leave the higher molecular weight and hydrated polyvinylpyrrolidone in a second stratified layer; a second container having a refrigerating jacket there around together with inlet, outlet and drain ports; the said inlet ports being connected to the said first container together with a second stratification separating means in said second container; the refrigerating jacket in combination with inlet and outlet ports serving to stratify the polyvinylpyrrolidone solution into an upper layer containing low molecular weight polymer and a lower layer containing the middle molecular weight polymer; a third container having a heating jacket there around for volatilizing solvent therein; the third container being connected to the stratification separating means in the second container.

5. Apparatus for separating polyvinylpyrrolidone into fractions of relatively narrow molecular weight range comprising a container having a stirrer therein, a heating jacket there around, inlet and outlet ports, means for the delivery of polyvinylpyrrolidone and solvent thereto together with means for separating stratified fluid layers therein; said heating and stirring means serving to dissolve the middle and low molecular weight polyvinylpyrrolidone into a solution in acetone and to leave the higher molecular weight and hydrated polyvinylpyrrolidone in a second stratified layer; a second container having a refrigerating jacket there around together with inlet, outlet and drain ports; the said inlet ports being connected to the said first container together with a second stratification separating means in said second container; the refrigerating jacket in combination with inlet and outlet ports serving to stratify the polyvinylpyrrolidone solution into an upper layer containing low molecular weight polymer and a lower layer containing the middle molecular weight polymer; a third container having a heating jacket there around for volatilizing solvent therein; the third container being connected to the stratification separating means in the second container; the heating jacket on said third container serving to distill out pure solvent to leave behind a relatively concentrated solution of low molecular polyvinylpyrrolidone.

6. The process for separating polyvinylpyrrolidone into a plurality of narrow molecular weight range cuts, comprising the steps in combination of extracting crude polyvinylpyrrolidone with acetone at a temperature close to the boiling point of the acetone, stirring the acetone polyvinylpyrrolidone mixture to secure optimum extraction of low and middle molecular weight polyvinylpyrrolidone from high molecular weight polyvinylpyrrolidone and hydrated polyvinylpyrrolidone; stratifying the respective solutions, separating the stratified solution layers to remove the acetone solution of low and middle molecular weight polyvinylpyrrolidone, discharging the high molecular weight and hydrated polyvinylpyrrolidone for drying; chilling the solution of low and middle molecular weight polyvinylpyrrolidone to produce a stratification of layers into low molecular weight polyvinylpyrrolidone in acetone, and medium molecular weight polyvinylpyrrolidone, separating the stratified layers into low and medium molecular weight polyvinylpyrrolidone cuts and evaporating out the acetone therefrom.

7. The process for separating polyvinylpyrrolidone into a plurality of narrow molecular weight range cuts, comprising the steps in combination of extracting crude polyvinylpyrrolidone with acetone at a temperature close to the boiling point of the acetone, stirring the acetone-polyvinylpyrrolidone mixture to secure optimum extraction of low and middle molecular weight polyvinylpyrrolidone from high molecular weight polyvinylpyrrolidone and hydrated polyvinylpyrrolidone; stratifying the respective solutions, separating the stratified solution layers to remove the acetone solution of low and middle molecular weight polyvinylpyrrolidone, discharging the high molecular weight and hydrated polyvinylpyrrolidone for drying; chilling the solution of low and middle molecular weight polyvinylpyrrolidone to produce a stratification of layers into low molecular weight polyvinylpyrrolidone in acetone, and medium molecular weight polyvinylpyrrolidone, separating the stratified layers into low and medium molecular weight polyvinylpyrrolidone cuts and evaporating out the acetone therefrom and thereafter condensing and drying the acetone for reuse and recycle.

8. The process for separating polyvinylpyrrolidone into a plurality of narrow molecular weight range cuts, comprising the steps in combination of extracting crude polyvinylpyrrolidone with acetone at a temperature close to the boiling point of the acetone, stirring the acetone polyvinylpyrrolidone mixture to secure optimum extraction of low and middle molecular weight polyvinylpyrrolidone from high molecular weight polyvinylpyrrolidone and hydrated polyvinylpyrrolidone; stratifying the respective solutions, separating the stratified solution layers to remove the acetone solution of low and middle molecular weight polyvinylpyrrolidone, discharging the high molecular weight and hydrated polyvinylpyrrolidone for drying; chilling the solution of low and middle molecular weight polyvinylpyrrolidone to produce a stratification of layers into low molecular weight polyvinylpyrrolidone in acetone, and medium molecular weight polyvinylpyrrolidone, separating the stratified layers into low and medium molecular weight polyvinylpyrrolidone cuts and evaporating out the acetone therefrom and adjusting the temperatures respectively of the first stratification and the second stratification to determine the position in the primary molecular weight range at which the successive cuts are made.

References Cited in the file of this patent

FOREIGN PATENTS 613,519     Great Britain _____ Nov. 30, 1948

OTHER REFERENCES

Cragg et al.: "Chemical Reviews," August 1946, pp. 102–109.

Jirgensons: "Jour. of Polymer Science," vol. 8, pp. 519–27 (1952).